United States Patent
Fukabori et al.

(10) Patent No.: US 10,529,976 B2
(45) Date of Patent: Jan. 7, 2020

(54) ELECTRODE FOR A NON-AQUEOUS ELECTROLYTE SECONDARY BATTERY AND NON-AQUEOUS ELECTROLYTE SECONDARY BATTERY

(71) Applicant: TOPPAN PRINTING CO., LTD., Tokyo (JP)

(72) Inventors: Mayu Fukabori, Tokyo (JP); Hitoshi Kurihara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 119 days.

(21) Appl. No.: 15/298,949

(22) Filed: Oct. 20, 2016

(65) Prior Publication Data

US 2017/0040592 A1 Feb. 9, 2017

Related U.S. Application Data

(63) Continuation of application No. PCT/JP2015/002186, filed on Apr. 22, 2015.

(30) Foreign Application Priority Data

Apr. 22, 2014 (JP) .................. 2014-088424

(51) Int. Cl.
```
H01M 4/13      (2010.01)
H01M 4/62      (2006.01)
H01M 4/137     (2010.01)
H01M 4/36      (2006.01)
H01M 4/48      (2010.01)
H01M 4/60      (2006.01)
H01M 10/0525   (2010.01)
H01M 4/131     (2010.01)
H01M 4/1391    (2010.01)
H01M 4/485     (2010.01)
H01M 4/02      (2006.01)
```

(52) U.S. Cl.
CPC ............ *H01M 4/13* (2013.01); *H01M 4/131* (2013.01); *H01M 4/137* (2013.01); *H01M 4/1391* (2013.01); *H01M 4/364* (2013.01); *H01M 4/366* (2013.01); *H01M 4/483* (2013.01); *H01M 4/485* (2013.01); *H01M 4/602* (2013.01); *H01M 4/62* (2013.01); *H01M 4/622* (2013.01); *H01M 10/0525* (2013.01); *H01M 2004/027* (2013.01); *Y02T 10/7011* (2013.01)

(58) Field of Classification Search
CPC ........ H01M 4/13; H01M 4/131; H01M 4/137; H01M 4/1391; H01M 4/364; H01M 4/62; H01M 4/622; H01M 10/0525; H01M 2004/027; H01M 4/366; H01M 4/483; H01M 4/485; H01M 4/602; Y02T 10/7011
See application file for complete search history.

(56) References Cited

U.S. PATENT DOCUMENTS

| | | | |
|---|---|---|---|
| 8,652,688 B2 | 2/2014 | Yushin et al. | |
| 2012/0088155 A1 | 4/2012 | Yushin et al. | |
| 2012/0295155 A1* | 11/2012 | Deng ............. | H01B 1/122 |
| | | | 429/200 |
| 2014/0004426 A1 | 1/2014 | Kerlau et al. | |

FOREIGN PATENT DOCUMENTS

| | | |
|---|---|---|
| JP | 2000-348730 A | 12/2000 |
| JP | 2007-095670 A | 4/2007 |
| JP | 2007-157709 A | 6/2007 |
| JP | 2011-049046 A | 3/2011 |
| JP | 2013-197055 A | 9/2013 |
| JP | 2014-120459 A | 6/2014 |
| JP | 2014-167901 A | 9/2014 |
| WO | WO-2013/124950 | 8/2013 |
| WO | WO-2013/156888 | 10/2013 |

OTHER PUBLICATIONS

Kovalenko et al. "A Major Constituent of Brown Algae for Use in High-Capacity Li-Ion Batteries"; Science vol. 334 (Oct. 7, 2011 ), pp. 75-79. (Year: 2011).*
Miyach I et al. "Analysis of SiO Anodes for Lithium-Ion Batteries"; Journal of the Electrochemical Society, 152 (1) A2089-A2091 (Year: 2005) .*
Office Action issued in KR Patent Application No. 10-2016-7029444 dated Oct. 20, 2017.
International Search Report issued in International Patent Application No. PCT/JP2015/002186 dated Jul. 14, 2015.
Bonjae Koo, et al., "A Highly Cross-Linked Polymeric Binder for High-Performance Silicon Negative Electrodes in Lithium Ion Batteries", Angewandte Chemie International Edition (2012), v. 51, No. 35, pp. 8762-8767.
Extended European Search Report issued in EP Patent application No. 15782953.2 dated Oct. 13, 2017.
Chinese Office Action dated Oct. 15, 2018 in corresponding application No. 2015800209522.

* cited by examiner

*Primary Examiner* — Gregg Cantelmo
(74) *Attorney, Agent, or Firm* — Foley & Lardner LLP

(57) ABSTRACT

An electrode for a non-aqueous electrolyte secondary battery whose life properties can be improved, and a non-aqueous electrolyte secondary battery including the electrode. An electrode for a non-aqueous electrolyte secondary battery according to one aspect of the present invention includes a collector, and an active material layer formed on a surface of the collector. The active material layer includes an active material containing SiOx particles having surfaces to which a carboxyl group-containing polymer is bonded, and a binder made of a carboxyl group-containing water-soluble polymer having a carbohydrate structure. The polymer and the binder are bonded to each other.

18 Claims, 1 Drawing Sheet

ELECTRODE FOR A NON-AQUEOUS ELECTROLYTE SECONDARY BATTERY AND NON-AQUEOUS ELECTROLYTE SECONDARY BATTERY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/002186 filed on Apr. 22, 2015, which is based upon and claims the benefit of priority of Japanese Patent Application No. 2014-088424, filed on Apr. 22, 2014, the entire contents of which are all hereby incorporated by reference.

TECHNICAL FIELD

The present invention relates to an electrode for a non-aqueous electrolyte secondary battery and a non-aqueous electrolyte secondary battery.

BACKGROUND

Li ion secondary batteries are known as secondary batteries that can be repeatedly charged and discharged. Li ion secondary batteries are typically classified as non-aqueous electrolyte secondary batteries.

Life properties of such Li ion secondary batteries may become lower due to volume change accompanying occlusion and release of Li ions. In this regards, for example, Patent Literature 1 to Patent Literature 3 disclose conventional techniques which propose to suppress or prevent the lowering of life properties or to improve life properties.

CITATION LIST

Patent Literature

Patent Literature 1: JP-A-2007-157709
Patent Literature 2: JP-A-2011-049046
Patent Literature 3: JP-A-2007-095670

SUMMARY OF THE INVENTION

Technical Problem

As described above, studies have been conducted to attempt to suppress deterioration of life properties due to volume change accompanying occlusion and release of Li ions. However, the effects of the studies have not yet been sufficiently exerted, and the life properties are desired to be further improved.

Thus, the present invention aims to provide an electrode for a non-aqueous electrolyte secondary battery, which can improve life properties of the battery, and a non-aqueous electrolyte secondary battery including the electrode for a non-aqueous electrolyte secondary battery.

Solution to Problem

An electrode for a non-aqueous electrolyte secondary battery (hereinafter, also simply referred to as "electrode for a secondary battery") according to one aspect of the present invention includes a collector, and an active material layer formed on a surface of the collector. The active material layer includes SiOx particles as an active material capable of being alloyed with Li, a carboxyl group-containing polymer bonded to a surface of the active material, and a binder formed of a carboxyl group-containing water-soluble polymer having a carbohydrate structure. The polymer and the binder are bonded to each other.

Advantageous Effects of the Invention

According to the electrode for a secondary battery of one aspect of the present invention, the electrode for a secondary battery can be provided whose life properties are improved. In addition, according to the non-aqueous electrolyte secondary battery (hereinafter, also simply referred to as "secondary battery") of one aspect of the present invention, the secondary battery can be provided whose life properties are improved.

DESCRIPTION OF REPRESENTATIVE EMBODIMENTS

First Embodiment

Figure 1:
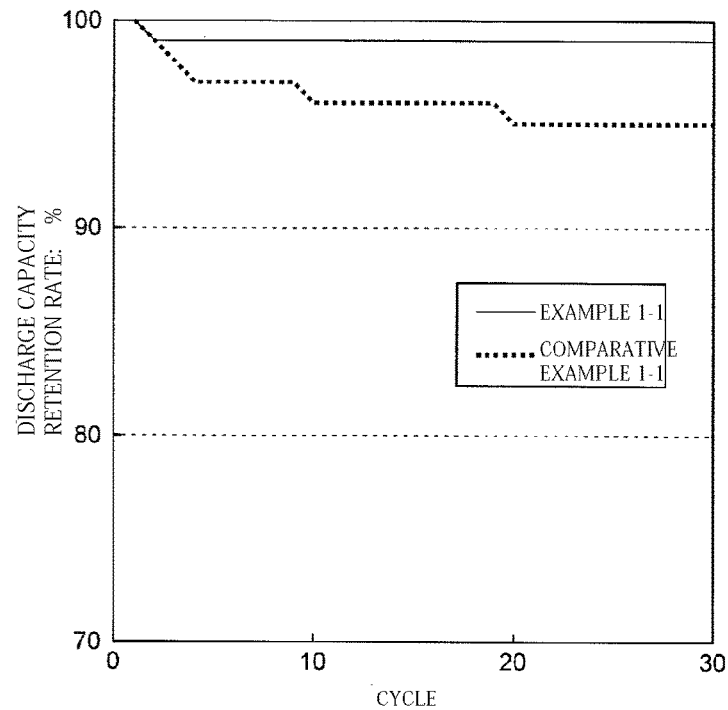
FIG. 1 is a graph illustrating relationships between the cycle number and a discharge capacity retention rate of an Example 1-1 of the present invention and a Comparative Example 1-1.

The inventor has earnestly conducted studies aiming to further improve life properties. As a result, it has been found that life properties are greatly improved by bonding a carboxyl group-containing polymer to surfaces of SiOx particles, as an active material, and using, as a binder, a carboxyl group-containing water-soluble polymer having a polysaccharide structure.

Specifically, an electrode for a secondary battery according to the first embodiment of the present invention includes a collector, and an active material layer formed on a surface of the collector. The active material layer contains SiOx particles as an active material that can be alloyed with Li, a carboxyl group-containing polymer bonded to the surface of the active material, and a binder made of a carboxyl group-containing water-soluble polymer having a polysaccharide structure. In addition, the polymer and the binder are bonded to each other.

Hereinafter, configurations of the electrode for a secondary battery according to the first embodiment of the present invention are described in detail. Note that, in the following detailed description, a number of specific details are described so that the embodiment of the present invention is completely understood. However, it would be apparent that one or more embodiments can be implemented without the specific details. Also, the following description is to be understood to be representative of the present invention and that the present invention is not necessarily limited to the following descriptions.

Active Material

The active material that can reversibly occlude and release Li includes a material that is alloyed with Li. For example, such an alloy contains one or more members selected from the group consisting of Si, Ge, Sn, Pb, Al, Ag, Zn, Hg, and Au. In the first embodiment of the present invention, SiOx particles are used as the active material. It is preferable that x is 1.5 or less. Note that, if x is more than 1.5, a sufficient amount of occlusion and release of Li may not be ensured. In addition, not only the SiOx particles but also graphite may be added as the active material.

The particle size (d50) of the active material used in the first embodiment of the present invention is preferably within a range of 0.5 μm or more to 10 μm or less. Note that if the particle size (d50) of the active material is larger than 10 μm, a current per a total surface area of the active material becomes large, which may increase resistance of the electrode and decrease capacity. In contrast, if the particle size (d50) of the active material is smaller than 0.5 μm, the active material more easily flocculates in a step of preparing electrode slurry, which may make it difficult to obtain slurry in which the active material is uniformly dispersed. Hence, the resistance of the electrode may increase, and the capacity may decrease.

Polymer

The carboxyl group-containing polymer to be used bonded to the surface of an active material preferably has a molecular weight lower than that of a water-soluble polymer (carboxyl group-containing polymer having a carbohydrate structure) forming a binder. For example, the carboxyl group-containing polymer includes polyacrylic acid, polymethacrylic acid, or polymaleic acid. Alternatively, the carboxyl group-containing polymer may be polyacrylate, polymethacrylate, or polymaleate. Preferably, the carboxyl group-containing polymer is polyacrylic acid. This is because polyacrylic acid has a large number of carboxyl groups and easily bonds to the surfaces of SiOx particles as an active material. Note that when polyacrylic acid and alginate (binder) are mixed with each other, the polyacrylic acid is preferentially bonded to the surfaces of the active material.

Binder

In the first embodiment of the present invention, as the binder, a carboxyl group-containing water-soluble polymer having a carbohydrate structure is used. That is, a polymer that is used is one which is made water soluble by some of the hydroxy groups contained in the carbohydrate structure being substituted by carboxyl groups. Specifically, alginate is preferably used. In the water-soluble polymer forming the binder, the hydroxy groups not substituted by carboxyl groups react with the carboxyl groups of the polymer bonded to the surface of the active material, resulting in dehydration condensation. Thereby, the polymer bonded to the active material and the binder are bonded to each other.

The ratio (i.e. content) of the water-soluble polymer (e.g. alginate or the like), which is added as the binder, to the active material is preferably in a range of 1 or more to 30 or less by mass ratio when the active material is taken to be 100 by mass ratio. In this regard, when the content (additive amount) of the water-soluble polymer is lower than the lower limit of the above range, sufficient binding may not be achieved. In contrast, when the content (additive amount) of the water-soluble polymer is higher than the upper limit of the above range, a capacity per volume of the electrode may greatly lower.

The ratio of the polymer (e.g. polyacrylic acid or the like) to be bonded to the active material to the active material (i.e. content) is preferably in a range of 0.1 or more to 10 or less by mass ratio when the active material is taken to be 100 by mass ratio. In this regard, when the content (additive amount) of the polymer is lower than the lower limit of the above range, portions where the polymer is not bonded is increased on the surface of the active material. Hence, the binder is easily bound to the portions, whereby the active material easily drops when the volume changes. In contrast, when the content (additive amount) of the polymer is higher than the upper limit of the above range, an SEI layer (Solid Electrolyte Interphase, solid electrolyte layer) formed of the polymer bonded to the active material may be thickened. Hence, the resistance of the battery increases, and the capacity may decrease.

Conductive Auxiliary Agent

When a conductive auxiliary agent is added to the active material layer, for example, carbon black, natural graphite, and artificial graphite, as well as, metal oxide such as titanium oxide and ruthenium oxide, and metal fiber, and the like can be used. Among them, a structured carbon black is preferable. Specifically, one type of this carbon black such as furnace black, ketjen black, or acetylene black (AB) is preferably used. Note that mixtures of carbon black with other conductive agents, such as vapor grown carbon fiber (VGCF), are also preferably used.

Solvent of Electrolytic Solution

Solvents of an electrolytic solution used for the secondary battery include, for example, low-viscosity chain carbonic esters such as dimethyl carbonate and diethyl carbonate, high-dielectric cyclic carbonic esters such as ethylene carbonate, propylene carbonate, and butylene carbonate, γ-butyrolactone, 1,2-dimethoxyethane, tetrahydrofuran, 2-methyltetrahydrofuran, 1,3-dioxolan, methyl acetate, methyl propionate, vinylene carbonate, dimethylformamide, sulfolane, and a mixed solvent thereof.

Electrolyte Contained in Electrolytic Solution

Electrolytes contained in the above electrolytic solution include, for example, $LiClO_4$, $LiBF_4$, $LiAsF_6$, $LiPF_6$, $LiCF_3SO_3$, $LiN(CF_3SO_2)_2$, LiI, $LiAlCl_4$, and a mixture thereof. Preferably, the electrolyte is $LiPF_6$.

EXAMPLES

Example 1

Hereinafter, an Example 1 of an aspect of the present invention is described in more detail. However, the present invention is not at all limited to the example 1.

Example 1-1

Positive electrode slurry (slurry containing a positive electrode active material) was prepared by the following procedure.

24 g of acetylene black (manufactured by Denka Company Limited, HS-100) and 41 g of NMP were added to an 120 g of NMP (N-methyl pyrrolidone) solution (manufactured by KUREHA CORPORATION, #7208) of PVdF (Polyvinylidene fluoride), followed by stirring for 10 minutes by use of HIVISMIX. Next, 144 g of NCM (lithium nickel cobalt manganese oxide, $LiNiCoMnO_2$) (NIHON KAGAKU SANGYO CO., LTD.) and 337 g of LMO (lithium manganese oxide, $LiMn_2O_4$) (MITSUI MINING & SMELTING CO., LTD., Type-F) were added, followed by stirring for 10 minutes. The ink was confirmed to be in a stiff consistency state and was further kneaded for 10 minutes. Thereafter, NMP was added for dilution so that the NV (solid content concentration) became 60%.

The obtained positive electrode slurry was applied to the collector. Aluminum (Al) foil having a thickness of 15 μm was used for the collector. The positive electrode slurry was applied by doctor blading so as to have a weight per unit area of 18.8 mg/cm². Next, the positive electrode slurry was dried for 30 minutes at a temperature of 120 degrees. The resultant object was pressed so as to have a density of 2.5 g/cm$^3$, whereby the positive electrode according to the Example 1-1 was obtained.

Negative electrode slurry (slurry containing a negative electrode active material) was prepared by the following procedure.

First, 15.02 g of polyacrylic acid and 15.03 g of sodium alginate were added to 100.01 g of water, followed by sufficient mixing using a planetary mixer. Next, 20.02 g of acetylene black (AB) and 5.02 g of vapor-grown carbon fibers (VGCF) were further added to the vessel, followed by mixing. Next, 100.05 g of SiO particles, whose particle size (d50) was 6.6 µm, and 40.07 g of graphite were added, followed by mixing. Finally, 375.09 g of water was added in stages for dilution. Thereby, the negative electrode slurry according to the Example 1-1 was obtained.

Copper foil having a thickness of 12 µm was prepared as the collector. The obtained negative electrode slurry was applied to the collector by doctor blading so as to have a weight per unit area of 1.3 mg/cm$^2$. After the collector to which the negative electrode slurry was applied was preliminarily dried for 30 minutes at 80 C°, the collector was pressed so as to have a density of 1.0 g/cm$^3$. Finally, the resultant object was dried under reduced pressure for 5 hours at 105 C°, whereby the negative electrode according to the Example 1-1 was obtained. The active material layer formed on the collector of this negative electrode was in a state where polyacrylic acid was bonded to the surfaces of the SiO particles, and the polyacrylic acid and the sodium alginate were bonded to each other.

Comparative Example 1-1

Negative electrode slurry was prepared by the following procedure.

First, 30.00 g of sodium alginate was added to 100.00 g of water, followed by sufficient mixing using a planetary mixer. Next, 20.02 g of acetylene black (AB) and 5.02 g of vapor-grown carbon fibers (VGCF) were further added, followed by mixing. Next, 100.05 g of SiO particles, whose particle size (d50) was 6.6 µm, and 40.07 g of graphite were added and, followed by mixing. Finally, 375.09 g of water was added in stages for dilution. Thereby, the negative electrode slurry according to the Comparative Example 1-1 was obtained.

The obtained slurry was applied to the collector and pressed by a procedure similar to that of the Example 1-1, whereby a negative electrode according to the comparative Example 1-1 was obtained.

(Preparation and Evaluation of Cell)

A coin cell was prepared by using the obtained negative electrode and positive electrode. Then, charge and discharge were evaluated for the negative electrodes according to the Example 1-1 and the Comparative Example 1-1. Charge and discharge were repeated 30 times in a voltage range of 3 to 4.25 V at 508 mA/g charging and 2560 mA/g discharging to carry out cycle evaluation. The coin cell used was a 2032 type. The obtained negative electrode was punched to obtain a circular disc having a diameter of 15 mm, and the obtained positive electrode was punched to obtain a circular disc having a diameter of 13.5 mm, to carry out evaluation. The coin cell was basically configured by the negative electrode, the positive electrode, and a separator (manufactured by Asahi Kasei Corporation, Hipore ND525).

Electrolytic solution to be used was obtained by adding LiPF$_6$ to a mixed solution of ethylene carbonate (EC) containing 5 wt % of fluoroethylene carbonate (FEC) and diethyl carbonate (DEC), which were mixed at a ratio of 3:7 (v/v), so that the LiPF$_6$ became 1M. In addition, the same separator was used in the Example 1-1 and the Comparative Example 1-1.

As shown in FIG. 1, cycle characteristics of the Example 1-1 were better than those of the Comparative Example 1-1. Specifically, the capacity was prevented from lowering in the first half of the cycle. From this result, it was confirmed that, according to the configuration of the first embodiment of the present invention, a stable SEI was formed with the polyacrylic acid polymer to prevent volume change of the active material, whereby the cycle characteristics were effectively improved.

Second Embodiment

The inventor has earnestly studied for further improvement of life properties. As a result, it has been found that the life properties and the capacity greatly improve by mixing polyacrylic acid and alginate and treating the mixture so as to be converted into an acid anhydride, in the electrode that uses SiOx particles as an active material.

Specifically, an electrode for a secondary battery according to the second embodiment of the present invention includes a collector, and an active material layer formed on a surface of the collector. The active material layer contains active material, i.e. SiOx, which can be alloyed with Li, a carboxyl group-containing acidic polymer bonded to the surface of the active material, and a binder formed of a carboxyl group-containing water-soluble polymer having a carbohydrate structure. In addition, the polymer and the binder are covalently bonded to each other by conversion into an acid anhydride.

Hereinafter, configurations of the electrode for a secondary battery according to the second embodiment of the present invention will be described in detail.

An active material, polymer, a conductive auxiliary agent, a solvent of an electrolytic solution, and an electrolyte contained in the electrolytic solution are substantially the same as those described in the first embodiment. Thus, detailed descriptions of these materials are omitted.

The binder according to the second embodiment has portions different from those described in the first embodiment. In addition, the additive according to the second embodiment has not been contained in the solvent of the electrolytic solution described in the first embodiment. Thus, hereinafter, the binder and the additive according to the second embodiment are mainly described in detail.

Binder

In the second embodiment of the present invention, as the binder, a carboxyl group-containing water-soluble polymer having a carbohydrate structure is used. That is, a polymer that is used is one which is made water soluble by some of the hydroxy groups contained in the carbohydrate structure being substituted by carboxyl groups. Specifically, alginate is preferably used. When the above material is used, the carboxyl group or the hydroxy group of the water-soluble polymer forming the binder and the carboxyl group of the polymer bonded to the surface of the active material are subject to dehydration bonding (dehydration condensation).

The ratio (i.e. content) of the water-soluble polymer (e.g. alginate or the like), which is added as a binder, to the active material is preferably in a range of 18 or more to 24 or less by mass ratio when the active material is taken to be 100 by mass ratio. In this regard, when the content (additive amount) of the water-soluble polymer is lower than the lower limit of the above range, sufficient binding may not be achieved. In contrast, when the content (additive amount) of the water-soluble polymer is higher than the upper limit of the above range, a capacity per volume of the electrode may greatly lower.

The ratio (i.e. content) of the polymer (e.g. polyacrylic acid or the like) to be bonded to the active material to the active material is preferably in a range of 6 or more to 12 or less by mass ratio when the active material is taken to be 100 by mass ratio. In this regard, when the content (additive amount) of the polymer is lower than the lower limit of the above range, a number of portions of the surface of the active material may not be bonded to the polymer. Hence, the SEI derived from reductive decomposition of the electrolytic solution generated from the surface of the active material cannot be inhibited, whereby Li ions may be consumed to lower the capacity. In contrast, when the content (additive amount) of the polymer is higher than the upper limit of the above range, the SEI layer may be thickened due to the polymer bonded to the active material. Hence, the resistance increases, and the capacity may decrease.

Additive

In the second embodiment, an additive may be added to the solvent for the electrolytic solution used for the secondary battery. The additive is, for example, fluoroethylene carbonate or vinylene carbonate.

Polymer

The molecular weight of the polymer according to the second embodiment may be within a range of one thousand or more and one million or less. Note that when the molecular weight of the polymer is within a range of one thousand or more and ten thousand or less, which is a molecular weight range typically applied to a polymer dispersant, the polymer especially easily covers the surface of active material. In addition, when the molecular weight of the polymer is 5000, the best effect can be obtained.

Example 2

Hereinafter, an Example 2 of an aspect of the present invention is described in more detail. However, the present invention is not at all limited to the Example 2.

Example 2-1

Positive electrode slurry (slurry containing positive electrode active material) was prepared by the following procedure.

24 g of acetylene black (manufactured by Denka Company Limited, HS-100) and 41 g of NMP were added to 120 g of NMP solution (manufactured by KUREHA CORPORATION, #7208) of PVdF and were stirred for 10 minutes by HIVISMIX. Next, 144 g of NCM (NIHON KAGAKU SANGYO CO., LTD.) and 337 g of LMO (MITSUI MINING & SMELTING CO., LTD., Type-F) were added and were stirred for 10 minutes. The ink was confirmed to be in a stiff consistency state and was further kneaded for 10 minutes. Thereafter, NMP was added for dilution so that the NV became 60%.

The obtained positive electrode slurry was applied to the collector. Aluminum (Al) foil having a thickness of 15 μm was used for the collector. The positive electrode slurry was applied by a doctor blade so as to have a weight per unit area of 18.8 mg/cm². Next, the positive electrode slurry was dried for 30 minutes at a temperature of 120 degrees. This was pressed so as to have a density of 2.5 g/cm³, whereby the positive electrode according to the Example 2-1 was obtained.

Negative electrode slurry (slurry containing negative electrode active material) was prepared by the following procedure.

Sodium alginate (manufactured by Kikkoman Biochemifa Company) of 1.00 g and polyacrylic acid (manufactured by Wako Pure Chemical Industries, Ltd., molecular weight is one million) of 0.26 g were added to water of 33.23 g and were stirred by using DISPER. Next, SiO particles (manufactured by OSAKA Titanium Technologies Co., Ltd.) of 4.13 g, AB of 0.82 g, and VGCF of 0.82 g were added and were stirred. Next, the stirred material was fully dispersed by using FILMIX, whereby the negative electrode slurry according to the Example 2-1 was obtained.

Copper foil having a thickness of 12 μm was prepared as the collector. The obtained negative electrode slurry was applied to the collector by the doctor blade so as to have a weight per unit area of 1.2 mg/cm². Next, the collector was preliminarily dried for 30 minutes at 80° C. This was pressed so as to have a density of 1.0 g/cm³. Finally, drying under reduced pressure was performed for 5 hours at 105° C., whereby the negative electrode according to the Example 2-1 was obtained. The active material layer formed on the collector of this negative electrode is in a state where polyacrylic acid is bonded to the surfaces of the SiO particles, and the polyacrylic acid and the sodium alginate are bonded to each other.

Example 2-2

0.75 g of sodium alginate (manufactured by Kikkoman Biochemifa Company) and 0.50 of polyacrylic acid (manufactured by Wako Pure Chemical Industries, Ltd., molecular weight is one million) were added to 33.27 g of water and were stirred by using DISPER. Next, 4.12 g of SiO particles (manufactured by OSAKA Titanium Technologies Co., Ltd.), 0.82 g of AB, and 0.83 g of VGCF were added and were stirred. Next, principal dispersion was performed by using FILMIX, whereby negative electrode slurry according to the Example 2-2 was obtained.

Then, a negative electrode according to the Example 2-2 was obtained by a procedure similar to that of the Example 2-1.

Example 2-3

0.50 g of sodium alginate (manufactured by Kikkoman Biochemifa Company) and 0.75 g of polyacrylic acid (manufactured by Wako Pure Chemical Industries, Ltd., molecular weight is one million) were added to 33.12 g of water and were stirred by using DISPER. Next, 4.12 g of SiO particles (manufactured by OSAKA Titanium Technologies Co., Ltd.), 0.82 g of AB, and 0.83 g of VGCF were added and were stirred. Next, principal dispersion was performed by using FILMIX, whereby negative electrode slurry according to the Example 2-3 was obtained.

Then, a negative electrode according to the Example 2-3 was obtained by a procedure similar to that of the Example 2-1.

Example 2-4

0.25 g of sodium alginate (manufactured by Kikkoman Biochemifa Company) and 0.90 g of polyacrylic acid (manufactured by Wako Pure Chemical Industries, Ltd., molecular weight is one million) were added to 33.01 g of water and were stirred by using DISPER. Next, 4.13 g of SiO particles (manufactured by OSAKA Titanium Technologies Co., Ltd.), 0.82 g of AB, and 0.82 g of VGCF were added and were stirred. Next, principal dispersion was performed by using FILMIX, whereby negative electrode slurry according to the Example 2-4 was obtained.

Then, a negative electrode according to the Example 2-4 was obtained by a procedure similar to that of the Example 2-1.

Example 2-5

1.00 g of sodium alginate (manufactured by Kikkoman Biochemifa Company) and 0.25 g of polyacrylic acid (manufactured by Wako Pure Chemical Industries, Ltd., molecular weight is 5000) were added to 33.31 g of water and were stirred by using DISPER. Next, 4.12 g of SiO particles (manufactured by OSAKA Titanium Technologies.), 0.82 g of AB, and 0.83 g of VGCF were added and were stirred. Next, principal dispersion was performed by using FILMIX, whereby negative electrode slurry according to the Example 2-5 was obtained.

Then, a negative electrode according to the Example 2-5 was obtained by a procedure similar to that of the Example 2-1.

Comparative Example 2-1

1.26 g of sodium alginate (manufactured by Kikkoman Biochemifa Company) was added to 52.89 g of water and were stirred by using DISPER. Next, 4.20 g of SiO (manufactured by OSAKA Titanium Technologies Co., Ltd.), 0.84 g of AB, and 0.84 g of VGCF were added and were stirred. Next, principal dispersion was performed by using FILMIX, whereby negative electrode slurry according to the Comparative Example 2-1 was obtained.

Then, a negative electrode according to the Comparative Example 2-1 was obtained by a procedure similar to that of the Example 2-1.

Preparation and Evaluation of Cell

A coin cell was prepared by using the obtained negative electrode and positive electrode. Then, charge and discharge were evaluated for the Examples 2-1 to 2-5 and the Comparative Example 2-1. Charge and discharge were repeated 50 times in a voltage range of 3 to 4.25 V at 508 mA/g charging and 2560 mA/g discharging to carry out cycle evaluation. A retention rate was calculated by: (discharge capacity at the 50th cycle)/(discharge capacity at the first cycle)×100. The coin cell used was a 2032 type. The negative electrode was punched to obtain a circular disc having a diameter of 15 mm, and the positive electrode was punched to obtain a circular disc having a diameter of 13.5 mm, to carry out evaluation. The coin cell was basically configured by the negative electrode, the positive electrode, and a separator (manufactured by Asahi Kasei Corporation, Hipore ND525). An electrolytic solution used was obtained by adding $LiPF_6$ to a mixed solution of ethylene carbonate (EC) containing 5 wt % of fluoroethylene carbonate (FEC) and diethyl carbonate (DEC) in a ratio of 3:7 (v/v) so that the $LiPF_6$ becomes 1M. The results are shown in FIG. 2 and table 1.

Figure 2:
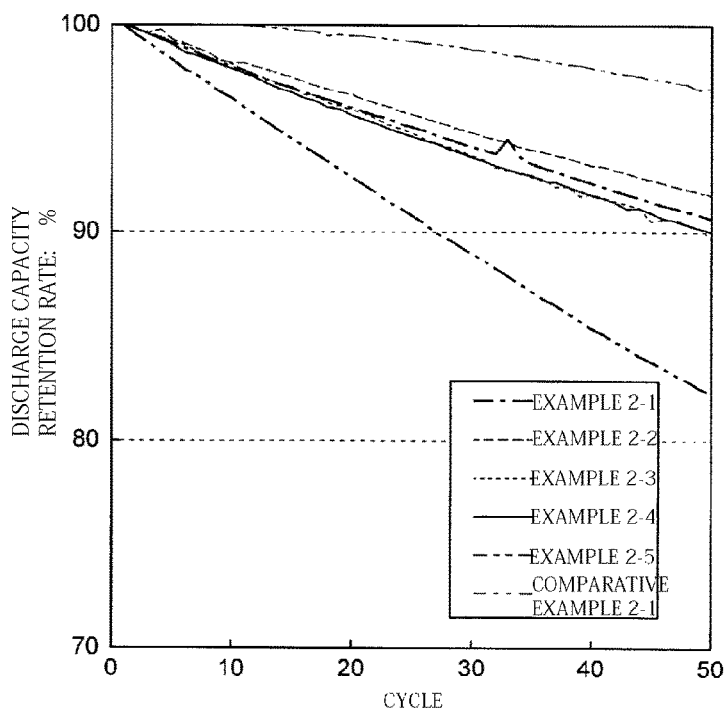
FIG. 2 is a graph illustrating relationships between the cycle number and a discharge capacity retention rate of an Example 2-1 to an Example 2-5 of the present invention and a Comparative Example 2-1.

As shown in FIG. 2 and table 1, regarding the life properties of the Examples 2-1 and 2-2, the capacity was improved compared with that of the Comparative Example 2-1. Furthermore, according to the Examples 2-1 and 2-2, the retention rate was improved compared with that of the Comparative Example 2-1. In addition, according to the Examples 2-3 and 2-4, the retention rate was improved compared with that of the Comparative Example 2-1.

Thus, in the case of sodium alginate/polyacrylic acid=6/4 to 8/2, the capacity and the life properties were better. In addition, according to the Example 2-5, in which sodium alginate/polyacrylic acid=8/2 was set, and the molecular weight of polyacrylic acid was set to 5000, both the capacity and the retention rate were good.

TABLE 1

| | Evaluation results | | |
|---|---|---|---|
| | Capacity before cycles mAh/g (mixture) | Capacity before cycles mAh/g (mixture) | Retention rate (% at 50th cycle) |
| Example 2-1 | 509 | 461 | 91 |
| Example 2-2 | 503 | 461 | 92 |
| Example 2-3 | 471 | 423 | 90 |
| Example 2-4 | 431 | 388 | 90 |
| Example 2-5 | 526 | 510 | 97 |
| Comparative Example 2-1 | 524 | 431 | 82 |

Hereinbefore, the present invention has been described with reference to the specific embodiments. However, the descriptions are not intended to limit the present invention. By referring to the descriptions of the present invention, other embodiments of the present invention in addition to the disclosed embodiments are apparent to those skilled in the art. Hence, it should be understood that the claims encompass the modifications and embodiments which are included in the scope and the spirit of the present invention.

As described in the first and second embodiments and the Examples, the electrode for a non-aqueous electrolyte secondary battery according to an aspect of the present invention can solve the problems to be solved by the present invention. Hereinafter, the problems to be solved by the present invention will be described in detail.

In recent years, aiming at the reduction of oil consumption and greenhouse gases, and further diversification and efficiency improvement of energy sources, Li-ion secondary batteries have received attention as secondary batteries that can be repeatedly charged and discharged. Specifically, applications to electric vehicles, hybrid electric vehicles, and fuel cell vehicles are expected to be developed. In the case of the electric vehicles, cruising distances are required to be increased, whereby, in the future, the secondary batteries will be further required to have high energy density.

When attention is paid to currently-used negative electrodes, graphite electrodes are typically used. The theoretical capacity of graphite is 372 mAh/g (active material). In contrast, as the active material having a capacity higher than that of graphite, Si and Sn have been receiving attention recent years. The theoretical capacity of Si is 4200 mAh/g (active material), and the theoretical capacity of Sn is 990 mAh/g (active material). Meanwhile, since Si has about 11 times the higher capacity than that of graphite, volume change accompanying occlusion and release of Li also becomes large. The volume increases by a factor of approximately four due to the occlusion of Li.

The electrode using an active material having high capacity greatly changes its volume due to charge and discharge, compared to an electrode using graphite. Therefore, there is a concern that the active material is separated from the electrode due to disconnection of a conductive path of the electrode or pulverization of the active material, and the active material layer is peeled off from the collector. This may become a factor of lowering the life properties of the battery.

In addition, the factors of lowering the life properties include consumption of Li due to the formation of SEI (solid electrolyte interphase). Specifically, since a Si active material causing great volume change accompanying charge and discharge may repeat destruction and generation of SEI, the consumption of Li due to the formation of SEI cannot be ignored.

Patent Literature 1 discloses a technique for preventing the capacity from lowering by using a negative electrode active material, in which a material including a repeating unit of alkylene oxide is formed, on surfaces of metal particles that can be alloyed with lithium. Specifically, in this negative electrode active material, one end of the material including a repeating unit of alkylene oxide is covalently bonded to the surfaces of the metal particles directly or through siloxane bond. Expansion of the active material can be partially suppressed by elasticity of the repeating unit. However, when expansion and contraction of the active material are large, volume change cannot be reduced, whereby sufficient cycle characteristics may not be obtained.

Patent Literature 2 discloses a technique for preventing an active material from being separated from the electrode during charging and discharging. In Patent Literature 2, a silicon-based active material that has been subject to a surface treatment and a binder are mixed and heated for dehydrative condensation. Thereby, the binder and the active material are covalently bonded to each other to increase binding force. Hence, the life properties can be prevented from lowering. However, Li consumption due to destruction and formation of SEI, which is a cause of lowering of the life properties, remains as a problem.

Patent Literature 3 discloses a negative electrode for a non-aqueous electrolyte secondary battery which includes an Si-containing active material, a binder, and a conductive material. The binder is polyimide and polyacrylic acid. The conductive material is a carbon material. In addition, polyacrylic acid is preferentially bonded to an Si-containing negative electrode active material, whereby polyimide can be suppressed from heavily covering the negative electrode active material. Hence, according to the description of Patent Literature 3, in addition to good binding properties and heat resistance properties, good electron conductivity can be obtained, and a non-aqueous electrolyte secondary battery having high energy density can be obtained by using the negative electrode, the secondary battery having good charge and discharge cycle properties, low-temperature properties, and heat resistance properties.

However, according to the negative electrode for a non-aqueous electrolyte secondary battery disclosed in Patent Literature 3, since the active material covered with polyacrylic acid and the binder are not covalently bonded to each other, the effect of suppressing separation of the active material due to the volume change during charging and discharging is not sufficiently obtained.

Effects of the Present Embodiment (1) Compared with electrodes for a non-aqueous electrolyte secondary battery according to conventional techniques having the problems describe above, the electrode for a non-aqueous electrolyte secondary battery according to the present embodiment includes a collector, and an active material layer formed on a surface of the collector. In addition, the active material layer contains active material, i.e. SiOx particles, which can be alloyed with Li, a carboxyl group-containing polymer bonded to the surface of the active material, and a binder formed of a carboxyl group-containing water-soluble polymer having a carbohydrate structure. In addition, the polymer and the binder are bonded to each other.

Thus, according to the electrode for a non-aqueous electrolyte secondary battery according to the present embodiment, bonding of the carboxyl group-containing polymer to the surfaces of the SiOx particles, as an active material, forms a stable SEI having an appropriate thickness on the surface of the active material. Furthermore, binding of the water-soluble polymer contained as a binder to the polyacrylic acid bonded to the active material prevents separation of the binder from the active material when the volume changes with charging and discharging.

Hence, the present embodiment can provide an electrode for a non-aqueous electrolyte secondary battery whose life properties are improved.

(2) In addition, the water-soluble polymer forming the binder of the electrode for a non-aqueous electrolyte secondary battery according to the present embodiment may be alginate.

According to the above electrode for a non-aqueous electrolyte secondary battery, the water-soluble polymer contained as a binder and the polyacrylic acid bonded to the active material are more strongly bound to each other, whereby the binder is unlikely to be removed from the active material when the volume changes with charging and discharging.

(3) In addition, the polymer of the electrode for a non-aqueous electrolyte secondary battery according to the present embodiment may be polyacrylic acid.

According to the above electrode for a non-aqueous electrolyte secondary battery, bonding of polyacrylic acid to the surfaces of the SiOx particles, as an active material, forms a stable SEI having an appropriate thickness on the surface of the active material.

(4) In addition, the content of the polymer in the electrode for a non-aqueous electrolyte secondary battery according to the present embodiment may be in a range of 0.1 or more to 10 or less by mass ratio when the content of the active material is taken to be 100 by mass ratio.

According to the above electrode for a non-aqueous electrolyte secondary battery, a more stable SEI having an appropriate thickness is formed on the surface of the active material.

(5) In addition, the content of the water-soluble polymer forming a binder in the electrode for a non-aqueous electrolyte secondary battery according to the present embodiment may be in a range of 1 or more to 30 or less by mass ratio when the content of the active material is taken to be 100 by mass ratio.

According to the above electrode for a non-aqueous electrolyte secondary battery, while sufficient binding is retained on the surface of the active material, the capacity can be suppressed from lowering.

(6) In addition, the polymer of the electrode for a non-aqueous electrolyte secondary battery according to the present embodiment may be a carboxyl group-containing acidic polymer. In addition, the polymer and the binder may be covalently bonded to each other by treating them so as to be converted into an acid anhydride.

According to the above electrode for a non-aqueous electrolyte secondary battery, bonding of the carboxyl group-containing acidic polymer to the surfaces of the SiOx particles, an active material, forms a stable SEI having an appropriate thickness on the surface of the active material. Furthermore, since the water-soluble polymer contained as a binder and the acidic polymer bonded to the active material are covalently bonded to each other by treating them so as to be converted into an acid anhydride, the active material layer can be provided which can follow the volume change accompanying charging and discharging.

Hence, the present embodiment can provide an electrode for a non-aqueous electrolyte secondary battery whose life properties are improved.

When the polymer and the binder are covalently bonded to each other by treating them so as to be converted into an acid anhydride, the combination of the binder that is carboxylate and the carboxyl group-containing polymer that is acid is most preferable. Since the combination of the carboxylate binder and the carboxyl group-containing polymer is not a combination of acids or a combination of bases but is a combination of a base and an acid, the conversion into an acid anhydride progresses significantly. Specifically, it can be considered that when the base is carboxylate anion, and the acid is carboxylic acid, the carboxylate anion derived from base attacks carbon of the carbonyl group derived from acid in a nucleophilic manner, whereby the conversion into an acid anhydride progresses.

(7) In addition, when the polymer of the electrode for a non-aqueous electrolyte secondary battery according to the present embodiment is a carboxyl group-containing acidic polymer, the binder is formed of a carboxyl group-containing water-soluble polymer having a carbohydrate structure, and the polymer and the binder are covalently bonded to each other by treating them so as to be converted into an acid anhydride, the molecular weight of the polymer of the electrode for a non-aqueous electrolyte secondary battery according to the present embodiment may be within a range of one thousand or more and one million or less.

According to the electrode for a non-aqueous electrolyte secondary battery, an active material layer can be provided which can further follow the volume change accompanying charging and discharging.

In addition, the molecular weight of the polymer of the electrode for a non-aqueous electrolyte secondary battery described above may be 5000.

According to the above electrode for a non-aqueous electrolyte secondary battery, an active material layer can be provided which can further follow the volume change accompanying charging and discharging.

(8) In addition, when the polymer of the electrode for a non-aqueous electrolyte secondary battery according to the present embodiment is a carboxyl group-containing acidic polymer, the binder is formed of a carboxyl group-containing water-soluble polymer having a carbohydrate structure, and the polymer and the binder are covalently bonded to each other by conversion into an acid anhydride, the content of the polymer of the electrode for a non-aqueous electrolyte secondary battery according to the present embodiment may be in a range of 6 or more to 12 or less by mass ratio when the content of the active material is taken to be 100 by mass ratio.

According to the above electrode for a non-aqueous electrolyte secondary battery, a stable SEI having an appropriate thickness is formed on the surface of the active material.

(9) In addition, when the polymer of the electrode for a non-aqueous electrolyte secondary battery according to the present embodiment is a carboxyl group-containing acidic polymer, the binder is formed of a carboxyl group-containing water-soluble polymer having a carbohydrate structure, and the polymer and the binder are covalently bonded to each other by conversion into an acid anhydride, the content of the water-soluble polymer forming the binder of the non-aqueous electrolyte secondary battery according to the present embodiment may be in a range of 18 or more to 24 or less by mass ratio when the content of the active material is taken to be 100 by mass ratio.

According to the above electrode for a non-aqueous electrolyte secondary battery, while sufficient binding is retained on the surface of the active material, the capacity can be suppressed from lowering.

(10) The non-aqueous electrolyte secondary battery according to the present embodiment has, as a negative electrode, the above electrode for a non-aqueous electrolyte secondary battery.

Hence, according to the present embodiment, since the non-aqueous electrolyte secondary battery has the electrode whose life properties are improved, the non-aqueous electrolyte secondary battery can be provided whose life properties are improved.

INDUSTRIAL APPLICABILITY

The electrode for a non-aqueous electrolyte secondary battery provided by the present invention can be used for power supplies for various portable electronic devices, a driving storage battery for an electric vehicle requiring high energy density or the like, electrical storage apparatuses for various kinds of energy such as solar energy and wind-generated power, and an electrode of an electrical storage device of a household electric appliance or the like.

What is claimed is:

1. An electrode for a non-aqueous electrolyte secondary battery, comprising:
    a collector;
    and an active material layer formed on a surface of the collector,
    wherein the active material layer comprises an active material comprising SiOx particles, acetylene black and vapor-grown carbon fibers, polyacrylic acid bonded to a surface of the active material, and sodium alginate, and
    wherein the polyacrylic acid and the sodium alginate are bonded to each other,
    wherein x has a value of $1 \leq x \leq 1.5$,
    wherein a ratio of the polyacrylic acid to the active material is 6 or more to 12 or less to 100,
    wherein a ratio of the sodium alginate to the active material is 18 or more to 24 or less to 100, and,
    wherein the SiOx particles have a particle size (d50) of more than 0.5 μm to 10 μm or less.

2. The electrode for a non-aqueous electrolyte secondary battery of claim 1, wherein the polyacrylic acid and the sodium alginate
    are covalently bonded to each other by being converted into an acid anhydride.

3. The electrode for a non-aqueous electrolyte secondary battery of claim 2, wherein a molecular weight of the polyacrylic acid is within a range of one thousand or more and one million or less.

4. The electrode of claim 1, wherein the $SiO_x$ particles consist essentially of $SiO_x$.

5. The electrode of claim 1, wherein the $SiO_x$ particles are SiO particles.

6. The electrode of claim 1, wherein the SiO particles consist essentially of SiO.

7. The electrode for a non-aqueous electrolyte secondary battery of claim 1, wherein a mass ratio between the sodium alginate and the polyacrylic acid is from 6/4 to 8/2.

8. The electrode for a non-aqueous electrolyte secondary battery of claim 1, wherein the SiOx particles have the particle size (d50) of 6.6 μm to 10 μm or less.

9. The electrode for a non-aqueous electrolyte secondary battery of claim 1, wherein the SiOx particles have the particle size (d50) of 6.6 μm.

10. The electrode for a non-aqueous electrolyte secondary battery of claim 3, wherein the molecular weight of the polyacrylic acid is within a range of one thousand or more and ten thousand or less.

11. The electrode for a non-aqueous electrolyte secondary battery of claim 10, wherein the molecular weight of the polyacrylic acid is 5000.

12. The electrode for a non-aqueous electrolyte secondary battery of claim 10, wherein a mass ratio between the sodium alginate and the polyacrylic acid is from 6/4 to 8/2.

13. The electrode for a non-aqueous electrolyte secondary battery of claim 11, wherein a mass ratio between the sodium alginate and the polyacrylic acid is from 6/4 to 8/2.

14. The electrode for a non-aqueous electrolyte secondary battery of claim 11, wherein a mass ratio between the sodium alginate and the polyacrylic acid is 8/2.

15. The electrode for a non-aqueous electrolyte secondary battery of claim 1, wherein a molecular weight of the polyacrylic acid is lower than that of the sodium alginate.

16. The electrode for a non-aqueous electrolyte secondary battery of claim 3, wherein the molecular weight of the polyacrylic acid is lower than a molecular weight of the sodium alginate.

17. The electrode for a non-aqueous electrolyte secondary battery of claim 10, wherein the molecular weight of the polyacrylic acid is lower than a molecular weight of the sodium alginate.

18. A non-aqueous electrolyte secondary battery, comprising a negative electrode, which is the electrode of claim 1;
a positive electrode; and
a non-aqueous electrolyte intervening between the positive electrode and the negative electrode.

* * * * *